(12) United States Patent
Clark

(10) Patent No.: US 8,065,790 B2
(45) Date of Patent: Nov. 29, 2011

(54) BEARING MOUNTED SENSOR ASSEMBLY

(75) Inventor: Edward Russell Clark, Monroeville, OH (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 951 days.

(21) Appl. No.: 12/035,660

(22) Filed: Feb. 22, 2008

(65) Prior Publication Data
US 2008/0205806 A1  Aug. 28, 2008

Related U.S. Application Data

(60) Provisional application No. 60/891,361, filed on Feb. 23, 2007.

(51) Int. Cl.
*B23P 21/00* (2006.01)

(52) U.S. Cl. .......................... 29/709; 29/729; 242/378.4

(58) Field of Classification Search .................... 29/709, 29/729; 242/378.4
See application file for complete search history.

(56) References Cited

U.S. PATENT DOCUMENTS

| | | | | |
|---|---|---|---|---|
| 3,871,600 | A * | 3/1975 | Lindblad | 242/381.5 |
| 4,135,683 | A * | 1/1979 | Stephenson et al. | 242/378.4 |
| 4,164,336 | A * | 8/1979 | Higbee et al. | 242/378.4 |
| 4,394,993 | A * | 7/1983 | Stamboulian et al. | 242/378.4 |
| 6,911,817 | B2  | 6/2005 | Clark | |
| 6,923,506 | B2 * | 8/2005 | Tanabe et al. | 297/476 |
| 7,263,393 | B2 * | 8/2007 | Smith et al. | 600/310 |
| 7,288,930 | B2  | 10/2007 | Clark | |
| 7,753,246 | B2 * | 7/2010 | Scirica | 227/175.1 |

* cited by examiner

*Primary Examiner* — Carl Arbes

(57) ABSTRACT

A sensor assembly includes an insert mounted within a fixed structure and tabs that engaged the insert to secure the sensor assembly in a desired orientation. A cap is assembled over the sensor assembly and the interface between the tabs and the insert to prevent undesired removal.

22 Claims, 7 Drawing Sheets

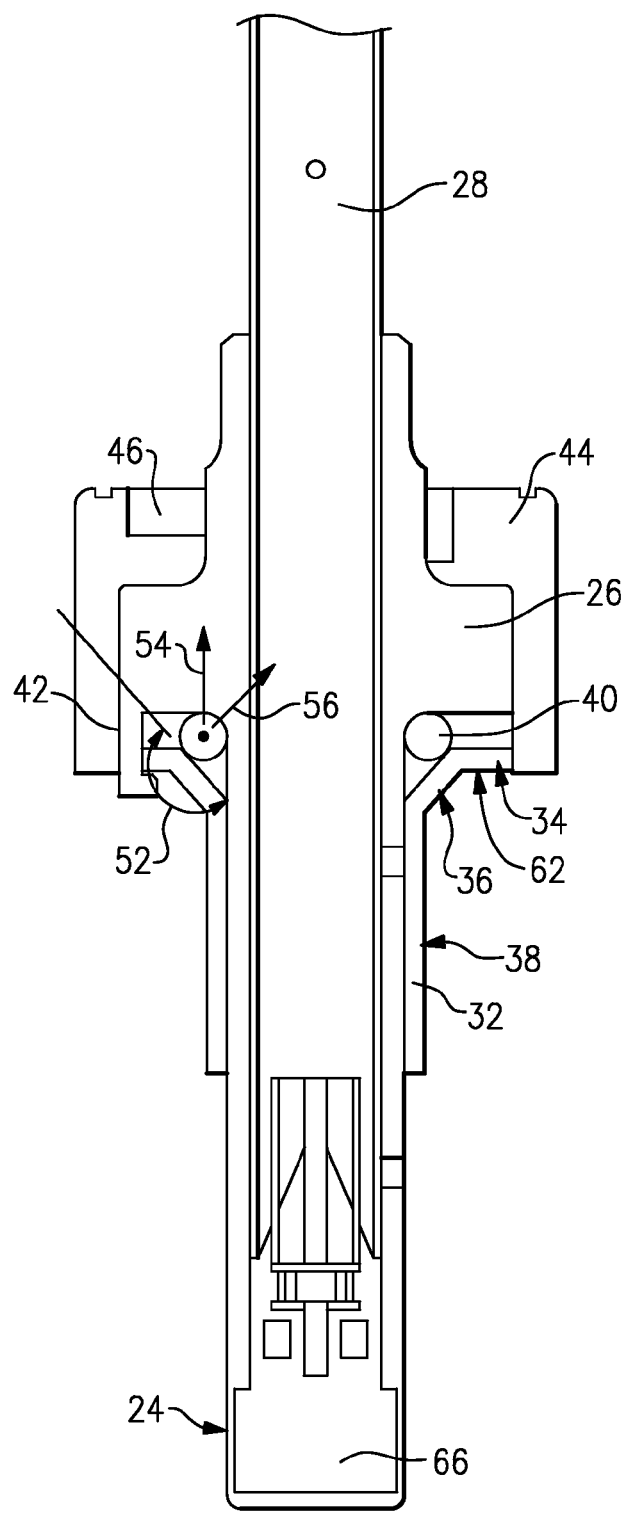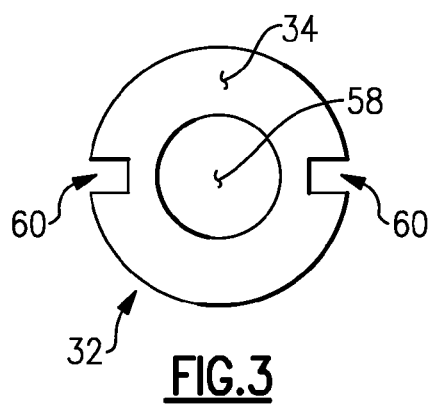
FIG.2
FIG.3

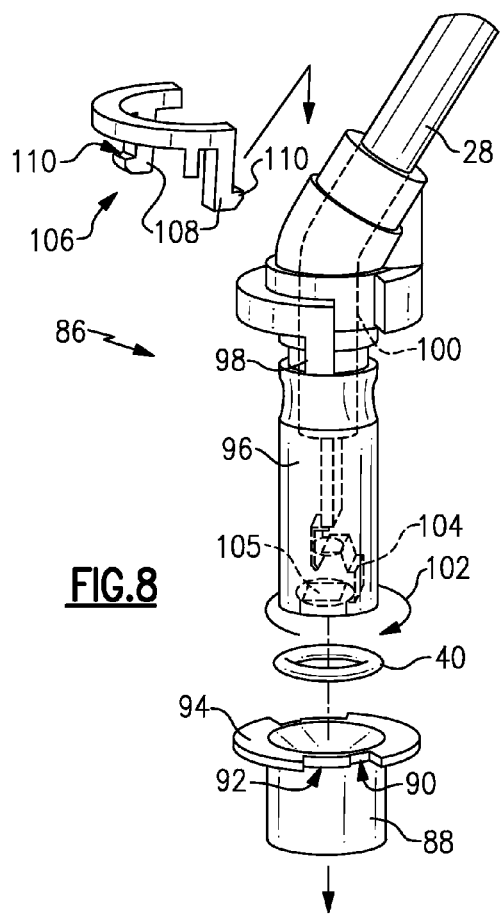
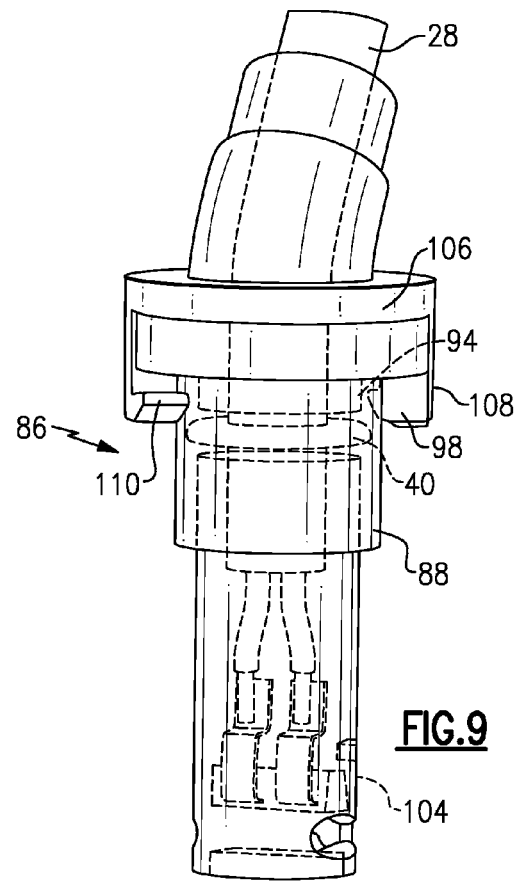
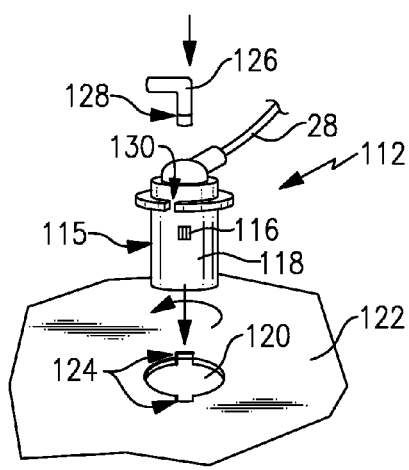
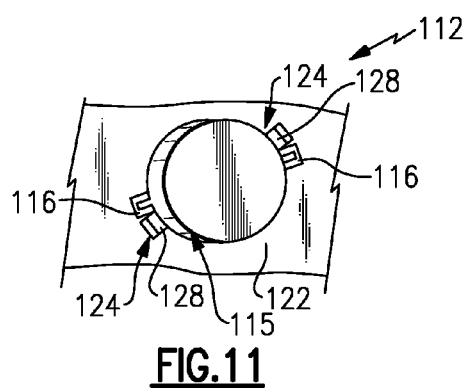

BEARING MOUNTED SENSOR ASSEMBLY

CROSS REFERENCE TO RELATED APPLICATION

The application claims priority to U.S. Provisional Application No. 60/891,361 which was filed on Feb. 23, 2007.

BACKGROUND OF THE INVENTION

This invention generally relates to system and device for mounting a sensor. More particularly, this invention relates to a system and device form mounting a sensor in a desired position without tools.

A sensor assembly typically includes a head or other surface that is aligned with a structure such as a magnet in the case of a magnetic field sensor to provide the desired measurement. To provide and maintain the desired alignment, the sensor assembly is typically secured to a fixed structure. In an anti-lock braking system, a sensor is attached to a fixed structure proximate a toothed ferrous material or magnet. A Hall Effect sensor is then utilized to measure changes in the magnetic field that are in turn indicative of wheel rotation. The sensor is typically partially inserted into a fixed structure such as a bearing block with a mounting clip including an opening for a threaded fastener. The threaded insert extends through an opening in the mounting clip and is threaded into a blind hole machined into the bearing block. Disadvantageously, such a configuration does not provide an indication of proper alignment, and is subject to loosening during operation. Further, the use of one threaded fastener generates a non-uniform biasing or securing force that is susceptible to contaminant intrusion.

Accordingly, it is desirable to design and develop a sensor assembly and mounting configuration that provides uniform securing forces and that provides both a physical and visual indication of proper alignment.

SUMMARY OF THE INVENTION

A disclosed example sensor assembly includes an insert mounted within a fixed structure and tabs that engaged the insert to secure the sensor assembly in a desired orientation. A cap is assembled over the sensor assembly and the interface between the tabs and the insert to prevent undesired removal.

The sensor assembly includes a body that extends through an insert. The insert is received within a fixed structure, such as for example a bearing housing. The insert includes a flange and the sensor assembly includes tabs that are received in notches within the flange. The tabs include a hook portion that engages an underside of the flange to secure the sensor assembly to the insert. An o-ring is disposed between the sensor and the insert to seal the interface and provide a biasing force to maintain the desired position of the sensor assembly during operation. A cap is installed over the tabs for preventing movement of the tabs toward a position allowing removal.

Accordingly, the example sensor assembly provides uniform biasing forces for preventing contamination intrusion and to assure proper and dependable sensor alignment.

These and other features of the present invention can be best understood from the following specification and drawings, the following of which is a brief description.

BRIEF DESCRIPTION OF THE DRAWINGS

FIG. 2 is a cross-sectional view of the example sensor assembly.

FIG. 3 is a top view of an example insert.

FIG. 8 is an exploded view of another example sensor assembly.

FIG. 9 is a side view of the example sensor assembly in a mounted position.

FIG. 10 is a schematic exploded view of another example sensor assembly.

FIG. 11 is a schematic view of the underside of an example cover with the mounted example sensor assembly.

DETAILED DESCRIPTION OF THE PREFERRED EMBODIMENT

Figure 1:
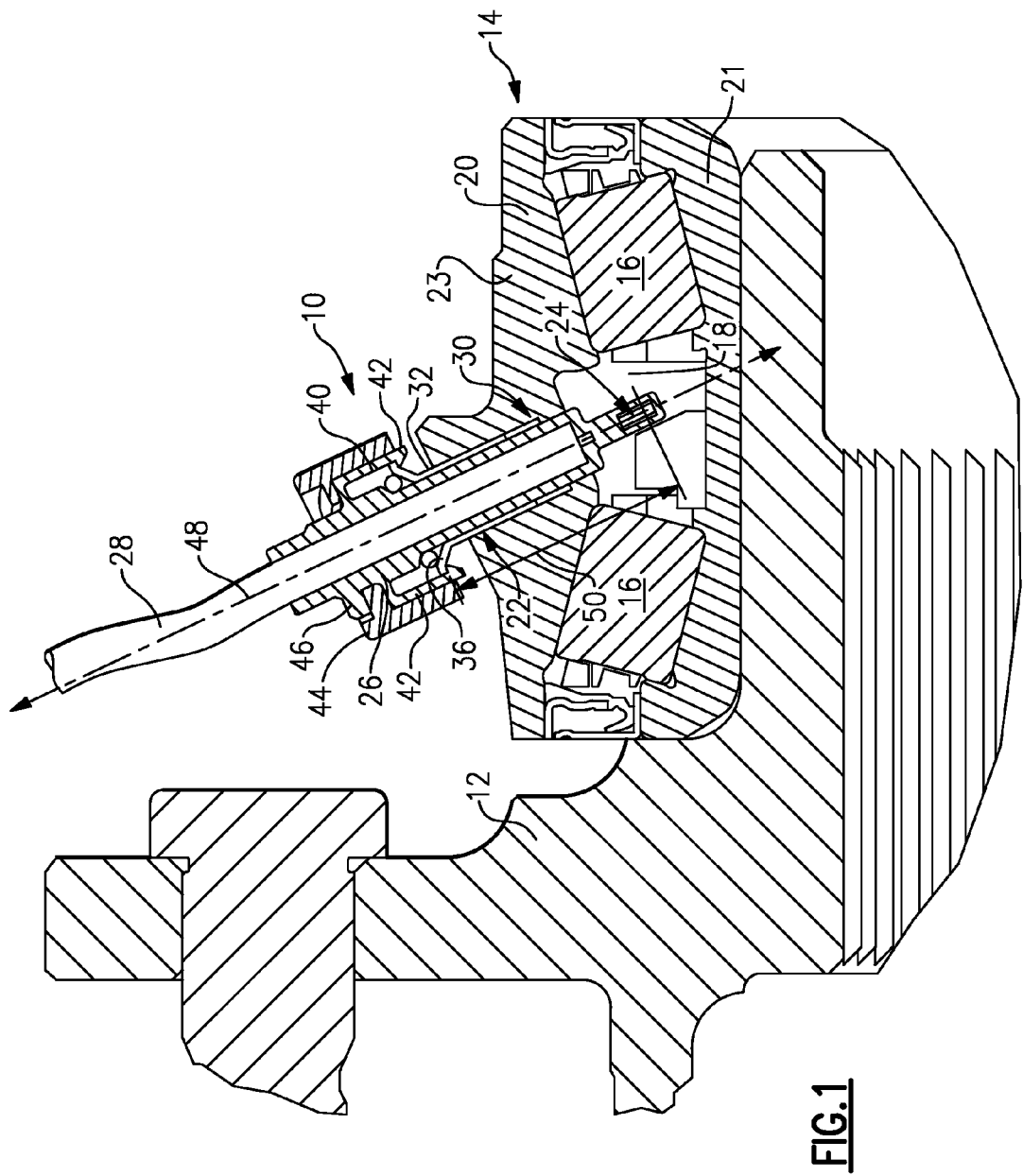
FIG. 1 is a cross-sectional view of an example sensor assembly mounted within a bearing block for a vehicle wheel assembly.

Referring to FIG. 1, an example sensor assembly 10 is mounted within a bearing assembly 14 of a wheel mount 12. The bearing assembly 14 includes rolling elements 16 disposed within a bearing housing 20. The bearing housing 20 includes an inner race 21 and an outer race 23. A magnetic encoder 18 is disposed within the housing 20 and rotates with the wheel mount 12. The example sensor assembly 10 includes a sensor head 24 that produces a signal indicative of rotation of the wheel mount 12. The relative position and air gap between the sensor head 24 and the magnetic encoder 18 is controlled by the example mounting features and method.

The example sensor assembly 10 and mounting method is described and disclosed as an integral cable ABS sensor that provides signals indicative of wheel speed. The example sensor assembly 10 includes a cable 28 and a Hall sensor that is overmolded with a plastic material. The attachment features are integrally molded as part of the overmolded portions of the sensor assembly. As appreciated, other sensor assembly configurations such as those including a machined metal or otherwise formed outer shell would also benefit from the disclosures provided and are also within the contemplations of this invention. Further, other sensing devices and applications will also benefit from the disclosures of the example mounting features.

Referring to FIGS. 2 and 3 with continued reference to FIG. 1, the sensor assembly 10 includes a body 26 that extends through a bore 58 defined by an insert 32. The insert 32 is received within a bore 22 within the bearing housing 20. The example insert 32 is pressed into the bore 22 and held in place by an interference fit. The insert 32 can be held in place by other processes such as welding or by the application of an adhesive. The insert 32 is pressed into the bore 22 along an axis 48 to provide a desired axial position that provides a required distance 50 between a point on the magnet 18 and the sensor head 24. The insert 32 remains in the set axial and radial position to provide the desired alignment between the sensor head 24 and the magnet 18. The position of sensor head 24 to the magnet is both axially and radially aligned to provide the desired air gap with the magnet as is desired for the sensing application.

The insert includes a flange 34 that is spaced apart from the bearing housing 20 to provide the desired axial distance 50. The sensor assembly 10 includes tabs 42 that are received in notches 60 (FIG. 3) within the flange 34. The tabs 42 include a hook portion that engages an underside of the flange 34 to secure the sensor assembly 10 to the insert 32. An o-ring 40 is disposed between the sensor body 26 and the insert 32 to seal the bore 30 from potential contaminants. Further, the o-ring 40 provides a biasing force on the sensor assembly 10 to maintain the desired position during vibrations and other movements. The biasing force exerted by the o-ring 40 places a tension on the tabs 42 that further secure the sensor assembly 10 in the desired orientation.

A cap 44 is installed over the tabs 42 for preventing movement of the tabs 42 radially toward a position allowing removal of the sensor assembly 10. The cap 42 engages lugs 46 integrally formed on the sensor body 26 and locks in place over the tabs 42. The cable 28 extends through the cap 44 and provides the desired electrical connection to the vehicle controller (not shown).

Referring to FIGS. 2 and 3, the sensor assembly 10 includes the cap 44 that is attached over the tabs 42 that hooks to the underside surface of the flange 34. The example sensor head 24 includes a Hall Sensor 66 that senses changes in the magnetic field generated by the magnet 18 (FIG. 1). The insert 32 includes a sleeve portion 38 that is received and engages the bore 30 within the bearing housing 20. A seal surface 36 provides an angled transition between the sleeve 38 and the flange 34. The seal surface 36 includes an angle 52 relative to both the sleeve 32 and the flange 34. The angled seal surface 36 provides for the exertion of both an axial and a radial biasing force on the sensor assembly 10. The o-ring 40 is composed of an elastic material. The compressive forces between the insert 32 and the sensor body 26 are thereby exerted in both a radial direction 56 and an axial direction 54 to provide a constant biasing force to counter movement of the sensor assembly 10 during operation.

The insert 32 includes the flange 34 with the notches 60. The example notches 60 are spaced 180 degrees apart to provide a substantially uniform pressure on the o-ring 40. The symmetrical attachment interface between the tabs 42 and the flange 34 substantially prevents uneven application of securing forces. The uniform securing forces prevent complications that can occur that result from uneven securing forces. Although the example insert 32 includes two notches 60 spaced 180 degrees apart additional notches 60 and tabs could be utilized and arranged symmetrically about the insert 32. Further, the example insert 32 is circular with a corresponding circular flange, however other shapes as may be desired for application specific requirements could also be utilized and are within the contemplation of this invention.

Referring to FIG. 1, with continuing reference to FIGS. 2 and 3, the symmetrically arranged notches 60 also locate the sensor head 24 with the magnet 18. The example sensor head 24 is includes a side interface with the magnet 18. The sensor may be rotated 180 degrees from the position shown, so long as the side of the sensor head 24 is disposed adjacent the magnet 18. The position of the notches 60 assures this installation position. The rotational position of the insert 32 is further determined to provide not only the desired axial length 50 and orientation, but also the rotational orientation.

Figure 4:
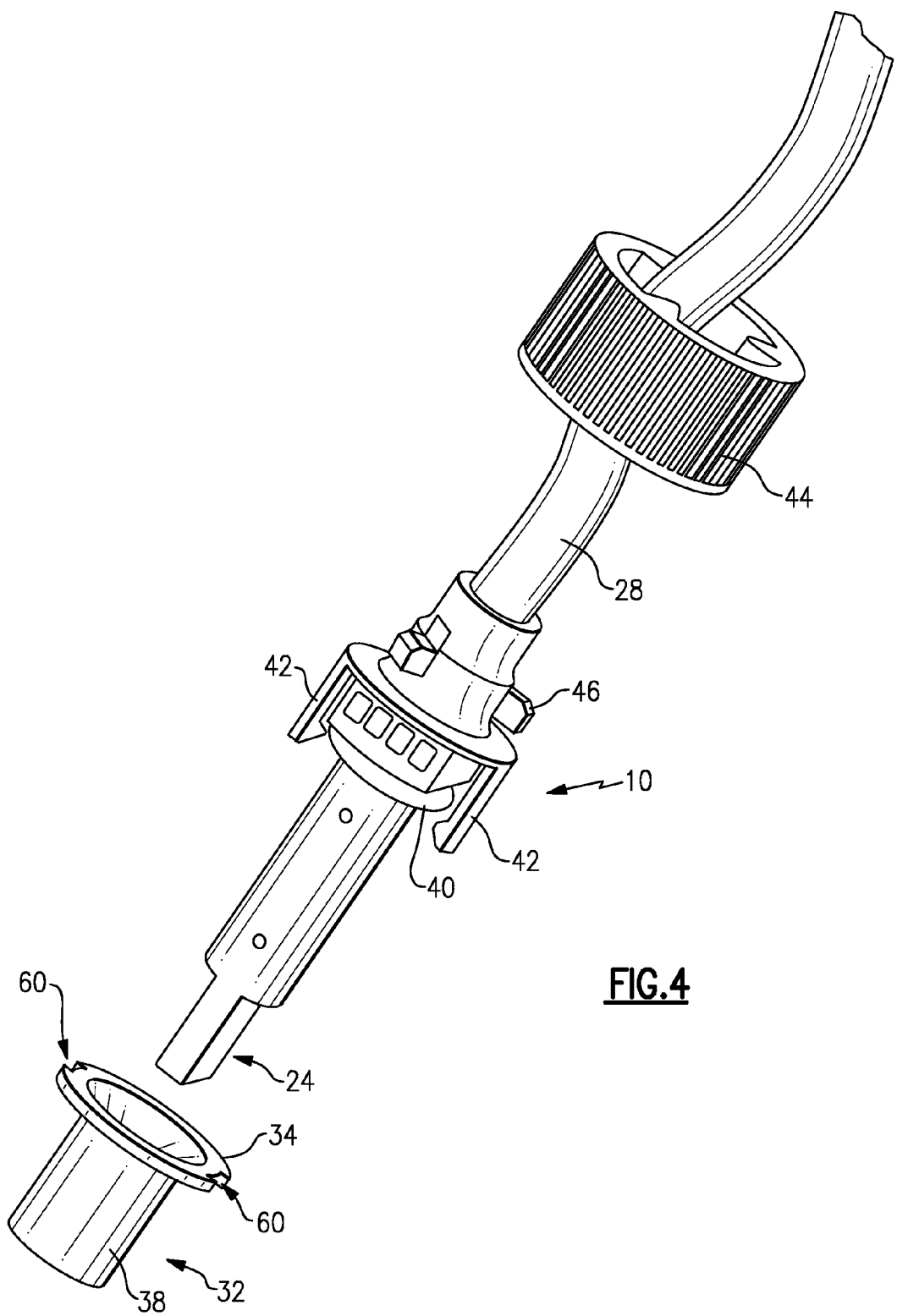
FIG. 4 is a perspective view of the example sensor assembly prior to mounting.
Figure 5:
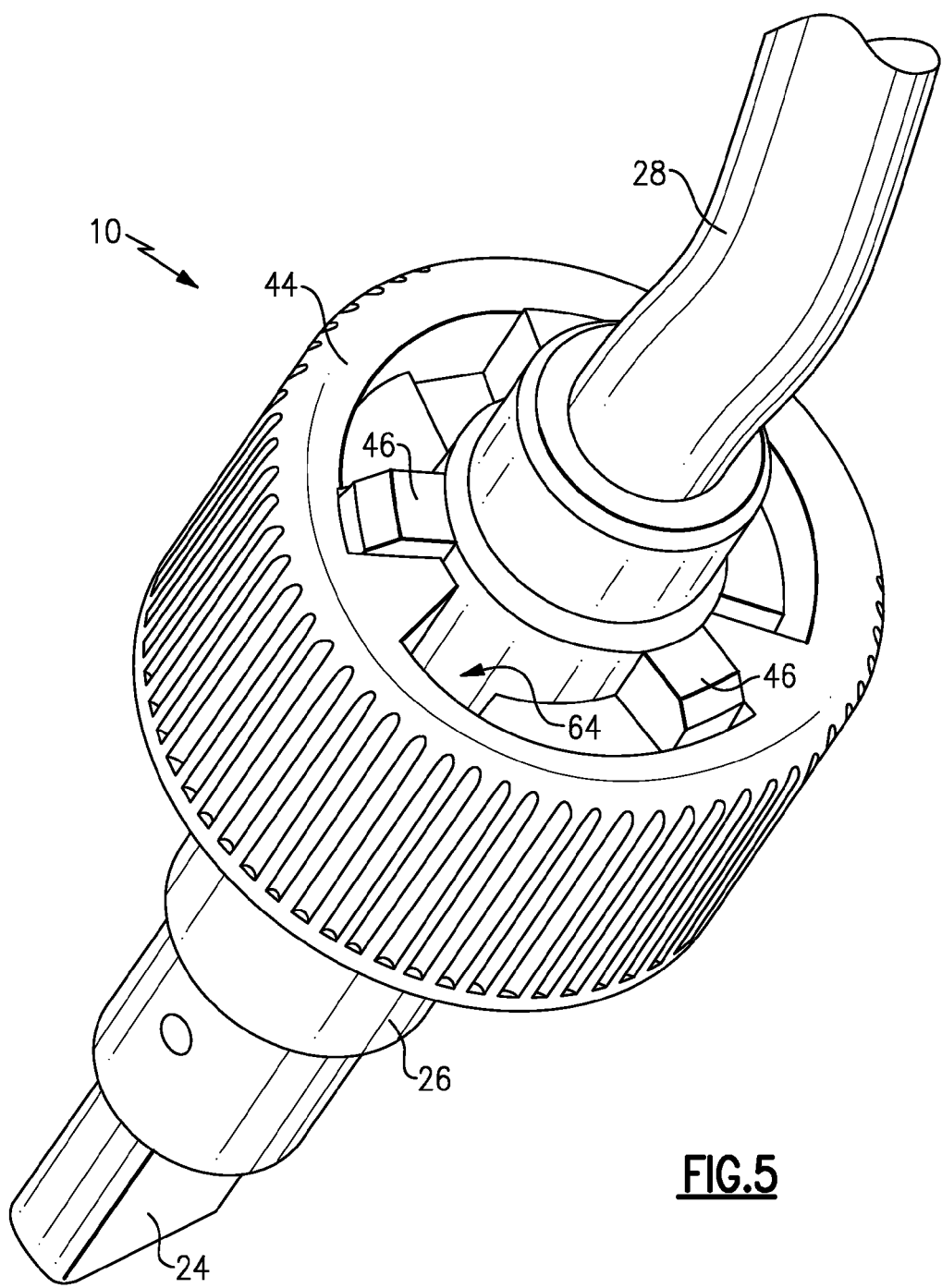
FIG. 5 is a perspective view of an example locking collar in a locked position.

Referring to FIGS. 4 and 5, the example sensor assembly 10 includes the cap 44 provides a check that the sensor assembly is fully secured and in the proper position. The cap 44 includes slots 64 that correspond to the lugs 46 integrally formed on the sensor body 26. The example cap 44 includes ramped slots 46 that, upon rotation of the cap 44, slide under the lugs 46, thereby locking the cap 44 in place. If the cap 44 extends downward over the tabs 42 and prevent the tabs 42 from expanding radially outward from the flange 34 to a position where the hooked portions of the tabs 42 could disengage from the underside surface of the flange 34. The cap 44 includes an inner diameter that allows the cap 44 to be moved downward over the sensor body 26 and over the tabs 42, when the tabs 42 are received within the notches 60. If the tabs 42 are not fully received within the notches 60, the cap 44 will not fit over to provide an indication that the sensor assembly 10 is not properly seated.

Figure 6:
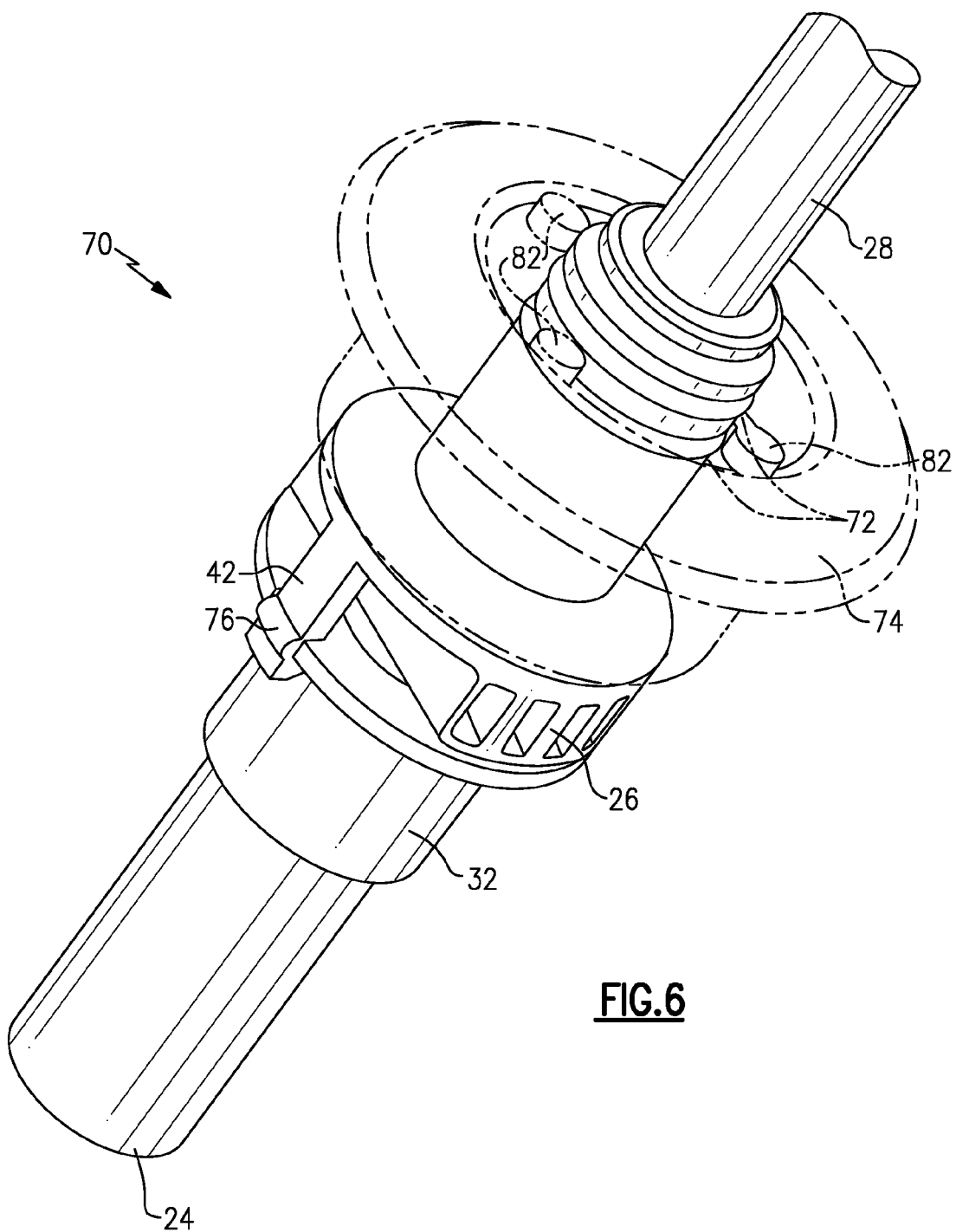
FIG. 6 is a perspective view of another example sensor assembly including a push on locking collar.
Figure 7:
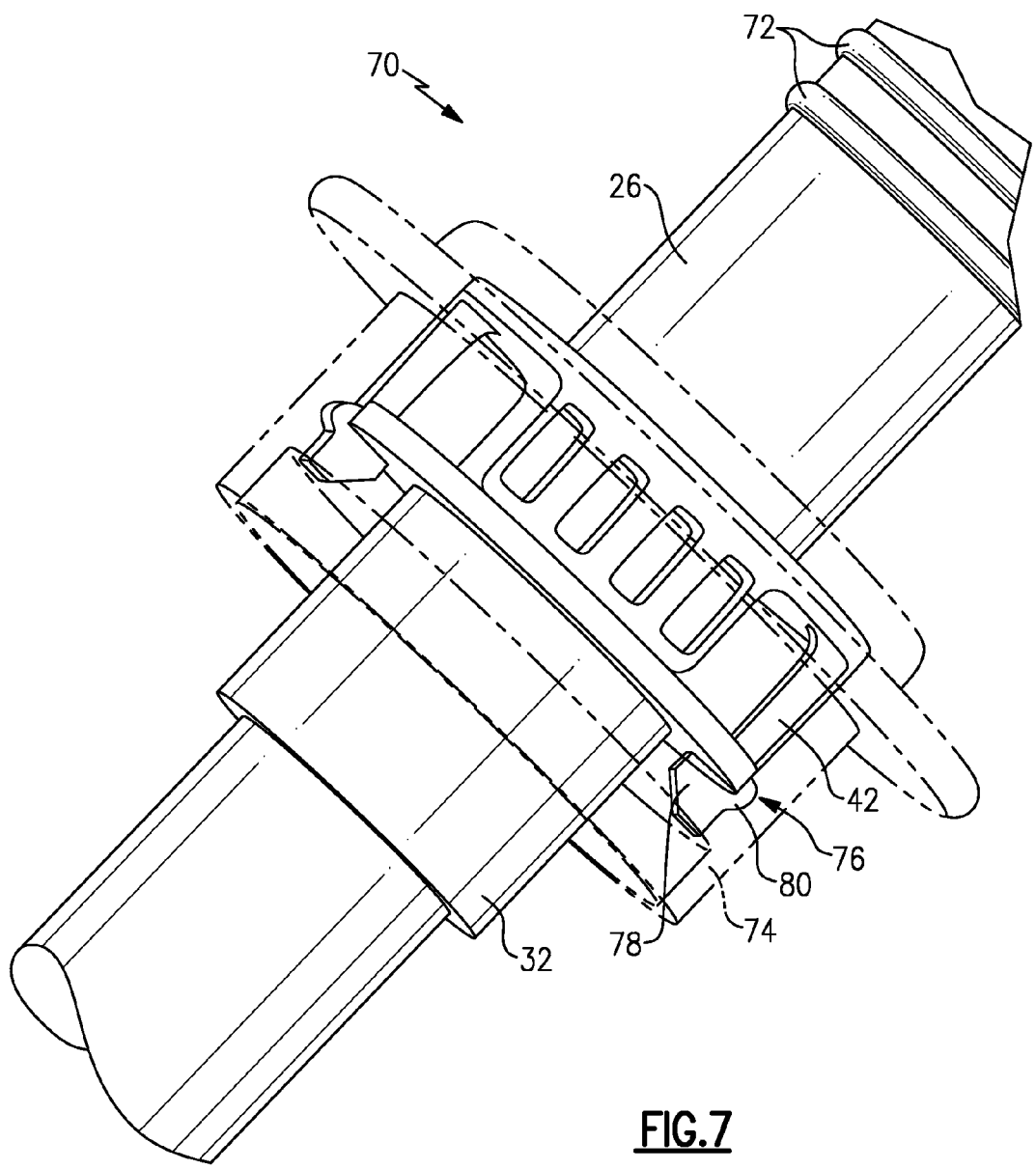
FIG. 7 is a perspective view of the example push on locking collar in a locked position.

Referring to FIGS. 6 and 7, another example cap 74 is pushed into place to indicate proper seating of the sensor assembly 10 and also to engage and secure the tabs 42. The example cap 74 is initially attached to the sensor assembly body 26 within a space defined between pre-position ribs 72. The cap 74 includes an inner diameter that corresponds with the diameter of the sensor body 26 between the pre-position ribs 72. The pre-assembly position illustrated in FIG. 6, the cap 74 is held away from the tabs 42, but is secured to the sensor body 26, such that the cap 74 is not loose. The pre-assembly position of the cap 74 provides a secure position that assures that the cap 74 is properly located during assembly and does not allow the cap to slide freely along the cable 28.

The cap 74 includes slots 82 extending radially outward from the opening of the cap 74. The slots 82 provide a desired flexibility that allows the cap 74 to be snapped out over the pre-position ribs 74 and down onto and over the tabs 42. Once the sensor assembly 10 is engaged to the insert 32, as described hereinabove, the cap 74 is pressed downward over the lower one of the pre-position ribs 72 and over the tabs 42.

Referring to FIG. 7, the cap 74 includes a groove 80 that engages a retention feature 76 on the tabs 42. The retention feature 76 is a bump shaped and sized to correspond with the groove 80 of the cap 74. The groove 80 is integrally formed on an inner surface of the cap 74. Pushing down of the cap 74 over the tabs 42 provide an indication of proper assembly and mounting of the sensor assembly 10. As appreciated, if the tabs 42 are not fully received within the notches 60, the cap 74 will not be movable to the assembled position as the radially or partially radially extended tabs 42 will define a radial position that is not accepted by the inner diameter of the cap 74. Once the tabs 42 are properly received within the notches 60, the cap 74 is pushed down onto and over the tabs 42. The groove 80 engages the bumps 76 on each of the tabs 42 to hold the cap 74 in the desired assembled position.

Referring to FIGS. 8 and 9, another sensor assembly 86 twist assembly and securing features. The sensor assembly 86 includes the sensor head 104 that includes an end sensing Hall Effect sensor 105. A sensor housing 96 is formed from a plastic material that encapsulates the Hall Effect sensor 105 and the electrical connection to the cable 28. The housing 96 includes slots 100 and rotary tabs 98. An insert 88 includes a flange 94 with a notch 90 and a rotary notch portion 92. The sensor assembly 10 is received within a bore of the insert 88. The insert 88 is assembled and received within an opening in the fixed structure to which the sensor assembly 10 is to be mounted, such as the example bearing assembly 14 (FIG. 1). The insert 88 is inserted to a desired depth determined to properly orientate the sensor head 102.

The sensor assembly 86 is received within the insert 88 and then rotated about the axis as indicated by arrows 102. The tabs 98 include a hooked portion that engages an underside of the flange 94. Rotation of the sensor assembly 10 moves the tabs 98 into the rotary notch portion 92, where the hooked portions of the tabs 98 are engaged and secured to the flange 94. An o-ring 40 is disposed between the sensor assembly 86 and the insert 88 and provides biasing force that creates a tension on the tabs 98 to aid in holding the sensor assembly 86 in place. Additionally, the o-ring 40 seals the interface between the insert 88 and the sensor assembly 86 to prevent the intrusion of undesired contaminants.

Once the sensor assembly 86 is twisted into the assembled position, a clip 106 is installed through the slot 100 in the sensor body 96 and into the notch 90. The clip 106 includes tabs 108 that extend through the slot 100 in the sensor body 96 and into the notch 90 of the insert 88. Each of the tabs 108 included hook portions 110 that lock into place and engaged an underside surface of the insert 88. The tabs 108 remain in the notches 90 and prevent rotation of the sensor assembly 86 in a direction that would allow removal. The tabs 108 block this rotation, thereby preventing removal of the sensor assembly 10. Further, the clip 106 provides a check to indicate that the sensor assembly 86 is completely rotated to the secured and locked position.

The clip 106 snaps into the notch 90 and cannot be removed without bending the tabs 108 back so that the hook portions 110 clear the notch 90. The example insert 88 and sensor assembly 86 include two symmetrically spaced apart notches and tabs, however, any number of symmetrically spaced notches and tabs would provide the desired uniform securement of the sensor assembly 86.

Referring to FIGS. 10 and 11, another example sensor assembly 112 includes a sensor 115 having a sensor body 118 from which extend tabs 116. The sensor body 118 also includes a flange 114 with slots 130. The sensor body 118 is received within an opening 120 of a cover 122 or other structure. The opening 120 is shown in a cover 122, but could also be within any housing our outer structure of a bearing, or other device into which the sensor 115 is to be mounted. The tabs 116 fit within notches 124 defined within the opening 120. A slight rotation of the sensor 115 seats the tabs 116 under the cover 122.

A clip 126 is then inserted through the slots 130 disposed within the flange 114 and into the no vacant notches 124. The clip 128 includes fingers 128 that extend through the slot 130 in the flange of the sensor 115 and into the notches 124 in the cover 122. The clip 126 prevents rotation of the sensor 115 back to the position where the tabs 116 are free to move through the notches 124. The clip 126 includes the locking feature that secures the clip 126 to an underside of the cover 122.

Accordingly, the example sensor assemblies and mounting configurations described and disclosed provide uniform biasing forces on the sensor assemblies for preventing contamination intrusion and to assure proper and dependable sensor alignment.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A sensor mounting assembly comprising:
a sensor housing including a body portion;
an opening within a fixed structure corresponding to the body portion of the sensor housing, the opening including at least two notches;
at least two tabs on the body portion securable within the at least two notches; and
a lock securable to the sensor body that prevents movement of the sensor housing toward an unsecured position.

2. The assembly as recited in claim 1, including an insert mountable to the fixed structure that includes the opening, wherein the at least two tabs are securable to the insert.

3. The assembly as recited in claim 2, wherein the insert includes the notches for receiving the tabs.

4. The assembly as recited in claim 3, wherein the insert includes a mount portion receivable within a fixed structure and a flange extending radially outward from the mount portion, wherein the notches are disposed within the flange.

5. The assembly as recited in claim 4, wherein rotation of the sensor body moves the tabs into contact with an underside of the flange of the insert.

6. The assembly as recited in claim 5, wherein the lock includes fingers that are receivable within the notches to prevent rotation of the sensor housing.

7. The assembly as recited in claim 1, wherein the opening includes notches corresponding to the at least two tabs and rotation of the sensor body moves the tabs into contact with an underside of the structure surrounding the opening.

8. The assembly as recited in claim 7, wherein the lock comprises a clip extending around the sensor housing for preventing rotation of the sensor housing.

9. The assembly as recited in claim 1, wherein the at least two tabs are disposed symmetrically about an outer circumference of the body portion.

10. The assembly as recited in claim 4, wherein the tabs comprise fingers including a snap-lock receivable within the notches and lockable against an underside of the flange.

11. A sensor mounting assembly comprising:
a sensor housing including a body portion,
an opening within a fixed structure;
at least two tabs on the body portion securable within the opening, the tabs including fingers including a snap-lock;
a lock securable to the sensor body that prevents movement of the tab toward an unsecured position; and
an insert mountable to a fixed structure that includes the opening, wherein the at least two tabs are securable to the insert, the insert including notches for receiving the tabs and a mount portion receivable within a fixed structure and a flange extending radially outward from the mount portion with the notches disposed within the flange, wherein the snap-lock is receivable within the notches and lockable against an underside of the flange, wherein the lock comprises a collar secured over the fingers for preventing movement of the fingers toward an unlocked position.

12. The assembly as recited in claim 11, wherein the collar is rotatable into a locked position on the sensor body.

13. The assembly as recited in claim 11, wherein the collar is pushed axially into engagement with a locking feature disposed on the sensor body.

14. The assembly as recited in claim 2, including a seal disposed between the sensor body and the insert.

15. The assembly as recited in claim 14, wherein the insert includes a seal surface disposed at an angle relative to the flange and the mount, and the seal is supported between the seal surface and the sensor body.

16. The assembly as recited in claim 14, wherein the seal comprises a resilient material and the angle of the seal surface provides for a radial force and an axial force on the sensor body.

17. A sensor assembly for mounting into a bearing block, the sensor assembly comprising:
an insert mountable into the bearing block;
a sensor housing including at least two tabs securable to the insert;
a seal disposed between the insert and the sensor housing; and
a lock for locking the sensor housing in a mounted condition to the insert.

18. The assembly as recited in claim 17, wherein the insert comprises a sleeve receivable within the bearing block for setting a desired axial position of the sensor housing within the bearing block.

19. The assembly as recited in claim 17, wherein the sleeve includes an outer dimension providing an interference fit with an opening defined within the bearing block.

20. The assembly as recited in claim 17, wherein the insert includes a sealing surface on which the seal is disposed, wherein the seal surface is disposed at an angle relative to the sleeve.

21. The assembly as recited in claim 17, wherein the insert includes a flange having notches corresponding to the tabs disposed on the sensor housing, wherein the tabs are received within the notches in a secured position.

22. The assembly as recited in claim 21, wherein the lock comprises a cap that is lockable to the sensor housing and prevents movement of the tabs toward a position allowing removal from the insert.

* * * * *